United States Patent [19]

Gerstenberger et al.

[11] Patent Number: 4,998,255
[45] Date of Patent: Mar. 5, 1991

[54] RESONANT PHASE MODULATOR

[75] Inventors: David C. Gerstenberger, Mountain View; Thomas J. Kane, Menlo Park; Richard Wallace, Los Altos, all of Calif.

[73] Assignee: Lightwave Electronics Corporation, Mountain View, Calif.

[21] Appl. No.: 420,045

[22] Filed: Oct. 11, 1989

[51] Int. Cl.$^5$ ............................................. H01S 3/10
[52] U.S. Cl. ...................... 372/28; 350/356; 372/100
[58] Field of Search ............... 372/26, 100, 28, 98; 350/353, 355, 356

[56] References Cited

U.S. PATENT DOCUMENTS

| | | | |
|---|---|---|---|
| 3,233,108 | 2/1966 | Rosenblum | 372/26 |
| 3,420,600 | 1/1969 | Mevers et al. | 372/26 |
| 3,586,416 | 6/1971 | De Bitetto | 350/356 |
| 4,081,760 | 3/1978 | Berg | 331/94.5 C |
| 4,174,504 | 11/1979 | Chenausky et al. | 331/94.5 C |
| 4,241,997 | 12/1980 | Chraplyvy | 356/309 |
| 4,271,397 | 6/1981 | Stiles et al. | 372/97 |
| 4,284,963 | 8/1981 | Allen, Jr. et al. | 331/94.5 H |
| 4,550,410 | 10/1985 | Chenausky et al. | 372/97 |
| 4,578,793 | 3/1986 | Kane et al. | 372/94 |
| 4,805,185 | 2/1989 | Smith | 372/99 |
| 4,829,532 | 5/1989 | Kane | 372/20 |

OTHER PUBLICATIONS

Lee, T. et al. "Light Beam Deflection with Electrooptic Prisms", IEEE Journal of Quantum Electronics, vol. QE-4, No. 7 (Jul. 1968) pp. 442–452.
Nelson, D. "The Modulation of Laser Light", Scientific American, vol. 218, No. 6 (Jun. 1968) pp. 17–23.
I. P. Kominov and E. H. Turner, Applied Optics, vol. 5 (1966), pp. 1612–1626.

Primary Examiner—Frank Gonzalez
Assistant Examiner—Susan S. Morse
Attorney, Agent, or Firm—Thomas Schneck; John Schipper

[57] ABSTRACT

Apparatus and method for modulating the phase or the amplitude of a monochromatic light beam, the apparatus including in one embodiment a Mach-Zehnder interferometer that consists of two beam splitters or beam combiners, a fully reflective mirror and an electro-optical crystal for modulation of one of two beam components. The electro-optical crystal serves as an optical resonator for the portion of the light beam admitted into the crystal material, using total internal reflection of the light beam from two or more of the crystal surfaces. The crystal has a high finesse so that a relatively small change in voltage applied across the crystal produces a large ($\approx 180°$) change in the external phase shift associated with the modulated component of the light beam. The modulated and unmodulated light beam components may be recombined for purposes of communication of information, using the mutual extinction of the two beam components when the optical phase shift between the two beam components is approximately 180°. Transverse or longitudinal electro-optical materials can be used for the crystal, and the driving voltages required are less than 50 volts in some configurations. Communications at frequency up to and beyond 1 GHz. are possible.

25 Claims, 6 Drawing Sheets

RESONANT PHASE MODULATOR

This invention was made with U.S. Government support under Contract NAS5-30487, awarded by NASA/Goddard Space Flight Center. The U.S. Government has certain rights in this invention.

FIELD OF THE INVENTION

This invention relates to electro-optical devices for modulating the phase or amplitude of a light beam.

BACKGROUND OF THE INVENTION

Electro-optical modulation of light beams such as laser beams is well known in general and is described in many textbooks such as *Optical Electronics* by A. Yariv, Holt, Rinehart and Winston Company, 1985, pp. 274–305. Most electro-optical devices are either bulk modulators or waveguide modulators.

Bulk modulators can handle large optical powers because the laser beam diameter can be of the order of the transverse dimension of the electro-optical crystal, which may be of the order of 1 cm. Consequently, the intensity or power density, expressed in Watts/cm$_2$, of the beam and the crystal can be held below the optical damage limit, even for high optical power systems. The power lost upon entering, propagating through and exiting from the bulk modulator can be quite small. However, the voltage required for good depth of modulation in such devices is usually hundreds to thousands of volts. Bulk electro-optical modulators are now available commercially from several crystal manufacturers.

A waveguide modulator requires much smaller voltages, on the order of 5–10 Volts for maximum depth of modulation. However, the power handling capability of these devices is limited to a few milliwatts because the laser beam is confined in a narrow portion of the modulator, typically having a width of several microns. Signal losses suffered in coupling into and out of a waveguide device are usually 6–8 dB, which is often unacceptable. Waveguide modulators are also available commercially.

One method of reducing the voltage required to provide good depth of modulation with a light modulator is to place the electro-optical crystal in a Fabry-Perot optical cavity that includes several high reflectivity surfaces. Near a resonance of this cavity, the voltage required for a given depth of modulation is reduced by the finesse of the cavity. According to one definition, finesse is the ratio of voltage required to change the resonant frequency of the cavity from one resonance to an adjacent resonance (a phase shift of $2\pi$), divided by the voltage required to change the resonant frequency between two half power points on the same resonance peak. An equivalent definition of finesse in terms of optical parameters is presented in A. Yariv, Optical Electronics, op.cit., pp. 92–94. The finesse itself may be a large, dimensionless number $F >> 1$. For example, if the reflecting surfaces of the Fabry-Perot optical cavity have reflectivities of $R = 0.9$, the finesse will be about 30 so that the driving voltages are reduced from several hundred volts to smaller voltages, such as 10–30 volts.

One version of a Fabry-Perot optical cavity that uses an electro-optical crystal with two reflecting surfaces is disclosed by F. Gires and P. Tournois, Comptes, Rendu, Acad. Sci. (Paris) Vol. 258 (1964) pp. 6112–6115.

Operation of an optical cavity near resonance in order to reduce the voltage requirement for an electro-optical modulator has not been widely used in the past, for several reasons. A resonantly enhanced electro-optical modulator must be used with a single frequency laser signal, and this has been hard to obtain. Further, the optical frequency of the laser source must be sufficiently stable to stay close to the desired resonance of the electro-optical modulator. A non-planar, internally reflecting ring laser, as described by Kane et al. in U.S. Pat. No. 4,578,793 and by Kane in U.S. Pat. No. 4,829,532, is a nearly ideal source for use with a resonantly enhanced electro-optical light modulator.

Use of an etalon external to a laser optical cavity for purposes of fine tuning the cavity output frequency is disclosed in U.S. Pat. No. 4,174,504, issued to Chanausky et al., in U.S. Pat. No. 4,550,410, issued to Hakini et al., and in U.S. Pat. No. 4,805,185, issued to Smith. Use of an etalon or equivalent means within an optical cavity to achieve a similar purpose is disclosed in U.S. Pat. No. 4,081,760, issued to Berg and in U.S. Pat. No. 4,284,963, issued to Allen et al. In U.S. Pat. No. 4,241,997, issued to Chraplyvy for a laser spectrometer with frequency calibration, two separate optical paths are formed, one containing a sample cell and the other containing a static etalon, with the light along each path being chopped at a different frequency to produce separate spectra for each path. None of these references discloses use of a dynamically controlled electro-optical material, functioning as an etalon in a two-path optical cavity, to control the phase and amplitude of a combination signal that issues from the cavity.

What is needed is a light modulator with low insertion loss, relatively low voltage requirements and high power handling capability. This package should also be reasonably compact.

SUMMARY OF THE INVENTION

The above requirements for an improved light modulator are met by a phase modulation apparatus that includes a monolithic resonant ring configuration. The ring configuration eliminates optical coupling between the modulator and the laser source of light that is being modulated. Operation of the modulator near resonance results in a reduction of the voltage required for a given depth of modulation.

In one embodiment, the modulator is an electro-optical crystal, having an initial surface to receive an incident polarized light beam and at least two side walls from which total internal reflection of the transmitted portion of the light beam occurs. The transmitted portion is recombined with the reflected portion of the light beam at the initial surface of the resonator, and the relative phase shift of these two beams is controlled by an electric field impressed on the crystal material. The resonator has a high finesse so that a relative small voltage swing can produce a large change in external phase shift of the output light beam. The light beam is controllably phase modulated by the resonator.

In a second embodiment, the phase modulator is used in one leg of a two-leg interferometer to produce amplitude modulated light.

In a third embodiment, the second optical path may also include an electro-optical crystal to produce a second phase shift of the same or opposite sign to the phase shift produced in the first optical path.

BRIEF DESCRIPTION OF THE DRAWINGS

FIGS. 8, 9 and 10 are plots of the external phase shift as a function of time for internal phase shift signals that issue from the crystal in FIGS. 3 or 7, for shifts in the crystal internal phase at rates of 300 Mbits/sec, 500 Mbits/sec for purposes of modulating the output signal from the apparatus, for a given size of modulator.

BEST MODE FOR CARRYING OUT THE INVENTION

Figure 1:
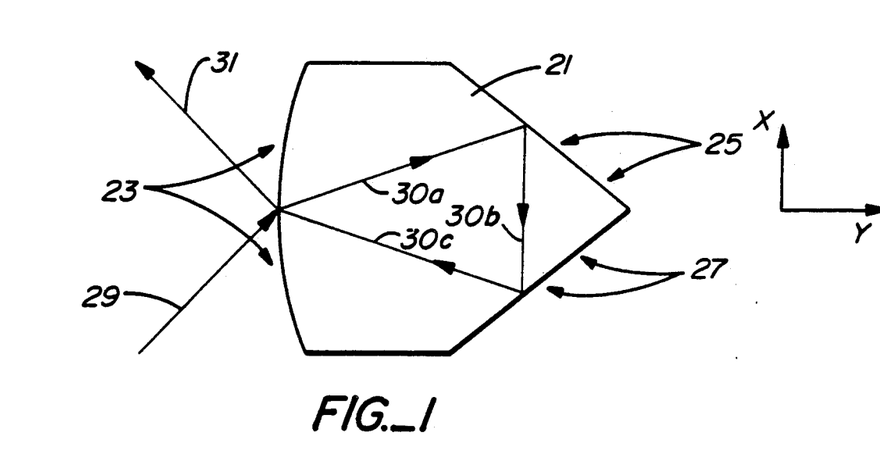
FIG. 1 is a geometric plan of an electro-optical crystal used in the invention.

With reference to FIG. 1, the electro-optical crystal 21 used in the invention preferably has the shape of a convex polygon with at least three faces 23, 25 and 27. The front face 23 of the crystal 21 that receives the input light wave 29 is preferably curvilinear (e.g., cylindrical or spherical) but may be planar as well. At least one of the faces 23, 25 and 27 should be curvilinear in order to provide a stable optical resonator. An input light beam 29 is received at the face 23 and the transmitted portion of the signal is refracted along a path 30a in the interior of the crystal 21 until the refracted ray encounters a second face 25. At the face 25 the refracted ray 30a is reflected by total internal reflection as a new ray 30b and propagates until the ray 30b encounters a third face 27 of the crystal 21. The ray 30b is then reflected by total internal reflection at the face 27 and propagates as a ray 30c to the original point of entry of the input light wave on the face 23. At this point, a transmitted or refracted portion 31 of this ray becomes the output signal and the remainder propagates once more along the ray paths 30a, 30b, 30c within the crystal 21, in a manner well known to those skilled in the art. The direction of the transmitted ray 31 that issues from the crystal 21 coincides with the direction of an incident ray that is reflected externally from the face 23 at the point of entry. The ray 31 consists of the reflected portion of the incident ray 29 plus the transmitted portion of the ray 30c.

An electro-optical crystal 21, such as used herein, is birefringent so that waves with electrical field vectors oriented in different directions may be affected by different refractive indices of the crystal material and thereby propagate at different velocities and with different refraction angles within the crystal. Imposition of an electrical field across the interior of the crystal causes the different refractive indices to increase or to decrease according to the sign of the electrical field and the direction of the electrical field within the crystal.

Figure 2:
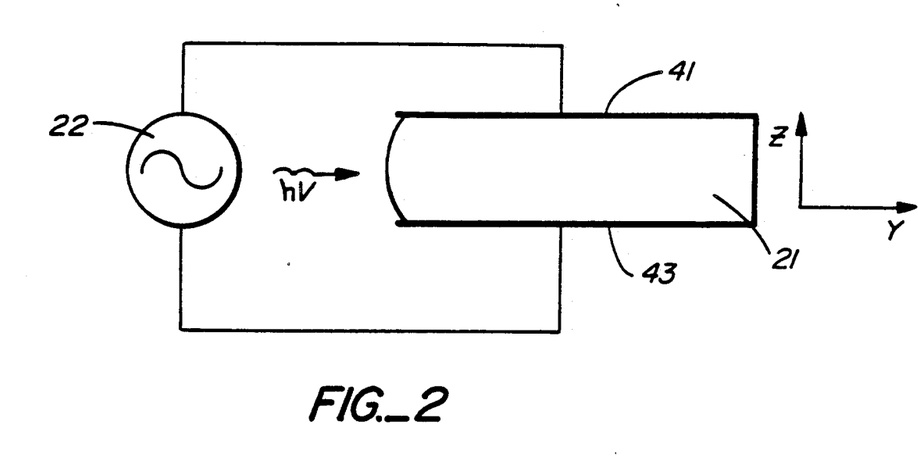
FIG. 2 is a schematic view of the electro-optical crystal in FIG. 1, additionally illustrating the means for impressing a voltage across the crystal.

In FIG. 2, the crystal 21 of FIG. 1 is shown in a side view, with two electrodes 41 and 43 positioned in a spaced apart relationship with the crystal 21 therebetween. A voltage source 22, which is preferably time varying, induces an electro-optical effect in the crystal that produces a controllable change in refractive indices associated with propagation of a light beam with two different polarizations within the crystal 21. In FIG. 2, the electrical field from the voltage source 22 is imposed transversely to the directions of propagation of the rays in the paths 30a, 30b, 30c in FIG. 1. Electro-optical materials for which the electrical field is imposed transversely are called transverse electro-optical materials. With another class of materials, called longitudinal electro-optical materials, the electrical field is imposed in a direction lying at least partly in the plane defined by the optical path of the light beam. Both transverse and longitudinal materials are of interest here.

For transverse electro-optical materials, the preferred direction of light beam polarization is in the direction of the largest magnitude electro-optical coefficient, and this direction in the crystal is oriented perpendicular to the plane defined by the optical path of the light beam within the crystal. As an example, light polarized parallel to the z-axis in a crystal of $LiNbO_3$ or $LiTaO_3$ may be propagated in the xy plane of the crystal (FIGS. 1 and 2) along the paths 30a, 30b and 30c shown in FIG. 1.

For longitudinal electro-optical materials the modulating electrical field vector lies in the plane defined by the optical path of the light beam in the crystal. Preferably, the electrodes should be positioned so that they do not interfere with propagation of the light beam to the front face 23 in FIG. 1 of the crystal 21.

The electro-optical materials of interest here are primarily linear materials, but non-linear electro-optical materials are also suitable for use with this invention. A crystal manifests a linear electro-optical effect if the change in each of the refractive indices caused by an applied electrical field varies approximately linearly with change of the electrical field. The linear electro-optical effect exists only in crystals that do not possess inversion symmetry.

Figure 3:
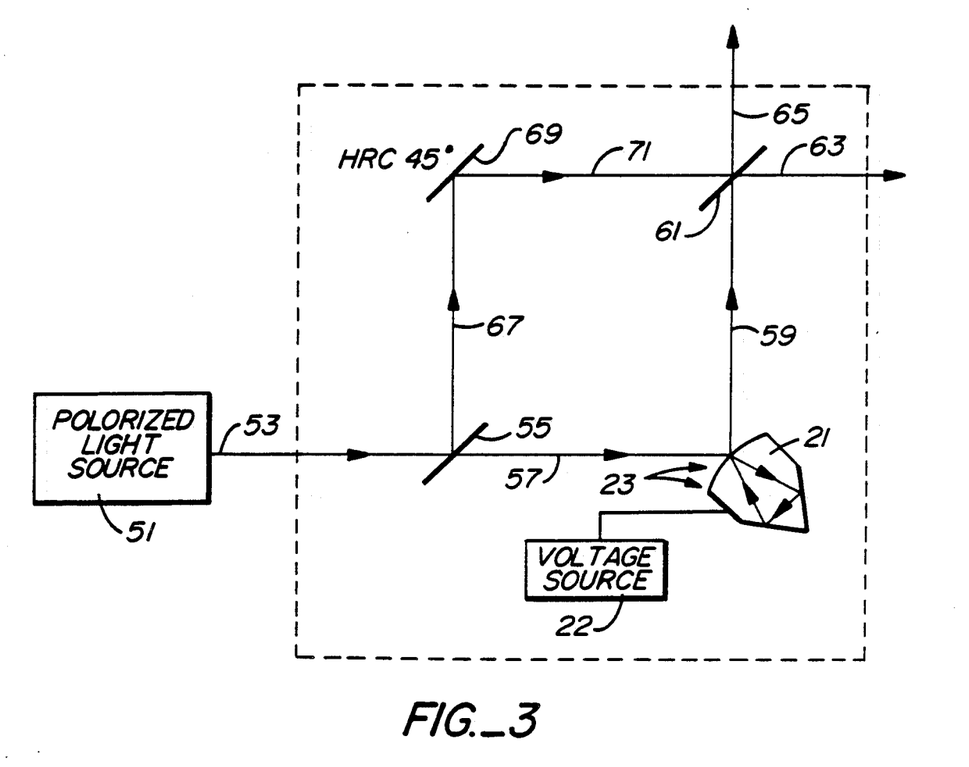
FIG. 3 is a plan view of a light wave modulation apparatus in one embodiment according to the invention.

FIG. 3 is a plan view of the invention in another embodiment, which allows amplitude modulation of the output beam. A laser system 51 produces a single frequency, polarized light beam that propagates along an optical path 53 until it encounters a 50/50 beam splitter 55 that transmits approximately 50 percent of the incident light and reflects the remainder. The transmitted light beam propagates along a first leg 57 of the first optical path until it encounters the front face 23 of the electro-optical crystal 21, where it undergoes refraction and propagation in the crystal as controlled by the impressed electrical field. The output signal from the electro-optical crystal 21 propagates along a second leg 59 of the first optical path until it encounters a second 50/50 beam splitter 61. One component of this output signal propagating along the leg 59 of the first optical path is reflected and proceeds along a first output path 63. The remaining portion of the wave that propagates along the leg 59 of the first optical path is transmitted through the second beam splitter 61 and proceeds along a second output path 65.

A second component of the light beam that propagates along the optical path 53 is reflected by the first 50/50 beam splitter 55 and propagates along a first leg 67 of a second optical path until it is fully reflected by a reflector 69. The second beam component then propagates along a second leg 71 of the second optical path until this beam component encounters the second 50/50 beam splitter 61. If the spatial modes of the beams in the legs 59 and 71 are properly overlapped at the beam splitter 61, these two beams will interfere with one another. Substantially, all light wave energy incident upon the crystal 21 is ultimately issued and propagates along the leg 59.

Preferably, the unactivated electro-optical crystal 21 is approximately resonant in the optical circuit shown in FIG. 2 so that the internal optical path $30a/30b/30c$ shown in FIG. 1 produces a temporal phase shift that is approximately $2N\pi$, where N is an integer, relative to the signal produced by the portion of the signal that is simply reflected from the side 23 of the crystal 21. A time-varying voltage difference is impressed transversely or longitudinally across the electro-optical crystal 21 in such manner that the difference in phase shifts associated with the light beam, as a result of propagation of the ray once along each of the paths $30a$, $30b$, $30c$ within the crystal 21, is of the form $(2K+1)\pi$, where K is an integer that may be positive or negative or zero.

Use of only the electro-optical crystal 21 in FIG. 3, with no beam splitters 55 and 61 and no reflector 69, allows the phase of the polarized light beam to be controllably modulated by combination of rays that are reflected at the crystal face 23 and output rays that are transmitted into the crystal. Use of all the apparatus shown in FIG. 3 allows the amplitude of the composite light beams (exiting along the paths 63 and 65) to be controllably modulated.

Figure 4:
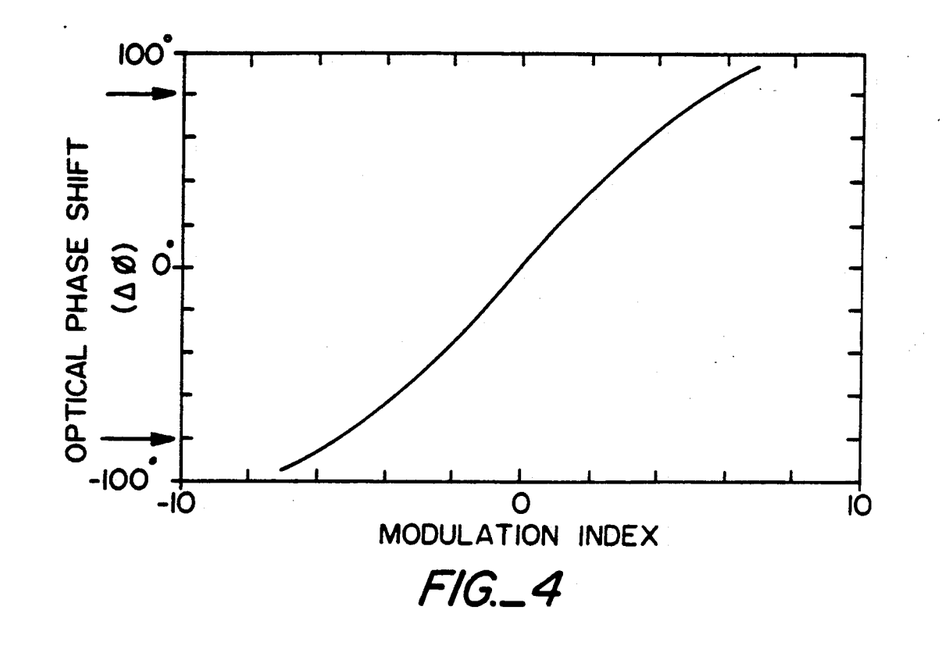
FIGS. 4 and 5 are plots of theoretical variations of optical reflectivity and optical phase shift introduced in the crystal of FIG. 2 through variation of the voltage impressed across the crystal.
Figure 5:
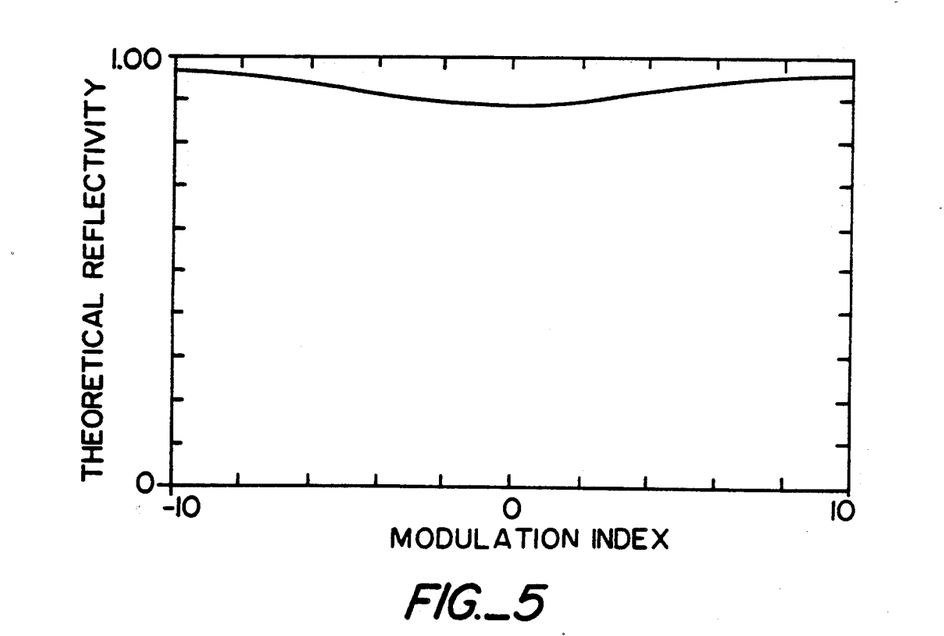

FIGS. 4 and 5 illustrate the modulation available through variation of the electrical field impressed across a linear electro-optical crystal. The theoretical phase shift $\Delta\phi$, shown in FIG. 4, of the reflected ray varies approximately linearly over a range $\leq 100° \leq \Delta\phi \leq +100°$ so that a full 180° phase shift swing is available here. The small amplitude dip in FIG. 5 is a result of an assumed 0.5 percent loss per round trip within the crystal 21 in FIG. 1, using a dielectric coating on the surface 23 with associated reflectivity $R=0.8$.

Figure 6:
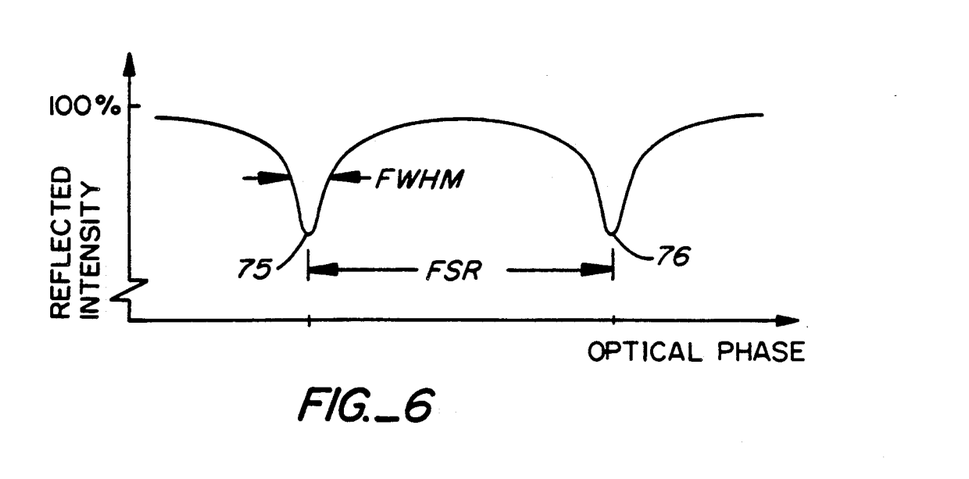
FIG. 6 is a plot of the variation of the amplitude of the output signal that issues from the electro-optical crystal of FIG. 3, used in the reflection mode.

FIG. 6 shows the normalized reflected optical power, expressed as a fraction of the input optical power, issuing from the electro-optical crystal 21 in FIG. 3, considered as an etalon. The normalized power, considered as a function of the optical path length within the etalon, of the frequency of the light beam, or of some equivalent variable, passes through a periodic sequence of maxima each time the round trip phase of the light propagating within the etalon changes by 360° or a multiple thereof. The optical phase depends upon etalon path length, etalon refractive index and frequency of the monochromatic light beam. The distance between two consecutive valleys 75 and 76 in FIG. 6 is called the free spectral range (FSR) of the etalon and is given by $$FSR = c/nL, \qquad (1)$$

where c is the speed of light, n is the refractive index of the etalon material and L is the round trip path length in the etalon material. From FIG. 6, it can be seen that the reflected optical power rises very sharply as one moves initially away from a value of the optical phase for which this power dips. Thus, the full width at half maximum (FWHM) of the reflected power curve shown in FIG. 6 is much less than FSR/2. The ratio FSR/FWHM is sometimes defined as the finesse of the etalon and is generally a number much larger than 1. This number is equivalent, optically, to the parameter $$F = \frac{\pi \sqrt{R}}{1 - R}, \qquad (2)$$

where $R = [R_1 R_2 R_3 (1-f_L)]^{\frac{1}{3}}$ is an equivalent reflectivity for the etalon, including the reflectivities $R_1$, $R_2$ and $R_3$ of the crystal faces 23, 25 and 27 and the fractional energy loss $f_L$ for a round trip within the crystal 21. For reflectivity $R=0.9$, the finesse is nearly 30. A finesse of at least 4.4, corresponding to a reflectivity R of at least 50 percent, is desirable for practice of the invention here, in order to limit the required FWHM voltage swing to reasonable values.

If an electro-optical crystal is used for the etalon material and a voltage difference is applied across the material, the reflected optical power, will vary with the applied voltage. The applied voltage required to vary the reflected power from the reflection maximum shown in FIG. 6 into the approximately flat region between the peaks can be much smaller than the voltage required to move one full free spectral range. If the input mirror transmission is greater than the product of the output mirror transmission and the round trip loss, the reflected wave goes through a 360° phase shift over one full FSR. Half of this phase shift (180°) occurs between two adjacent half power points (two points separated by the FWHM on a single peak as shown in FIG. 6). Thus, fast switching between a phase shift of $+90°$ and a phase shift of $-90°$ is available for purposes of modulation of the light beam that is ultimately reflected by the apparatus.

With reference to FIG. 3, if the two components of the light beam that propagate together along the output path 63 or 65 are of equal magnitude and equal spatial extent, but precisely 180° out of phase with one another, these two components will completely extinguish one another where they overlap so that a zero amplitude signal propagates along the output path 63 or 65, with approximately all the light energy propagating along the other path. On the other hand, if the phase shift is approximately 0°, these two components should add together and produce a signal amplitude that is approximately twice the amplitude of either signal by itself, and the light energy in the other path would be extinguished.

Figure 7:
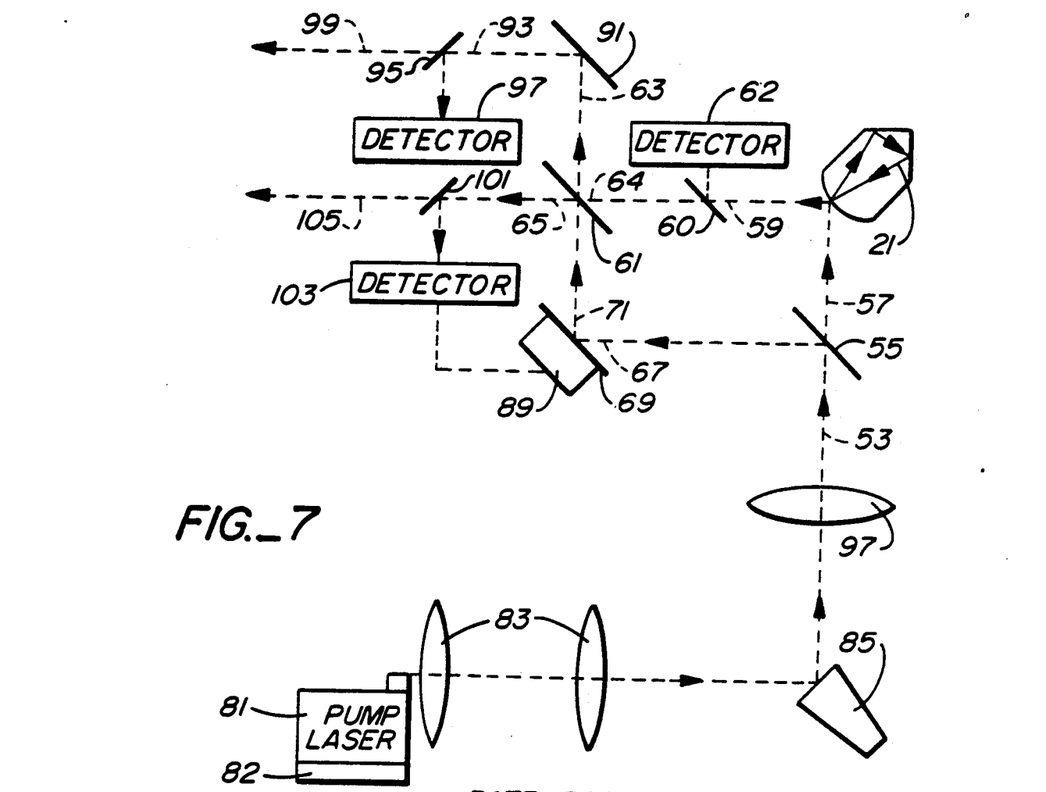
FIG. 7 is a plan view of another embodiment of apparatus according to the invention, additionally illustrating a single frequency source of the light wave to be modulated.

FIG. 7 illustrates, in more detail, an overall system in which the invention operates and is tested according to one embodiment. A diode laser 81, which preferably has a power output of about 1 Watt and is thermally controlled by a thermo-electric cooler 82, produces an output light beam that is passed through an optical system 83, such as an assembly of lenses, and is directed to a second laser 85 in order to pump this second laser. The second laser preferably produces cw output power at a single frequency, for example using the non-planar ring structure disclosed by Kane et al. in U.S. Pat. No. 4,578,793. The single frequency output is passed through a second optical system 87 (optional) in order to match the laser beam shape and size into the resonant modulator of the invention. The single frequency light beam passes along the input path 53 until it encounters the first 50/50 beam splitter 55, where the beam is divided into two equal energy contributions that propagate along different optical paths 57 and 67. In the first leg of the first optical path 57, the input beam encounters the electro-optical crystal 21, propagates therein, and is passed by a second leg 59 of the first optical path to the second 50/50 beam splitter 61. The second beam splitter 61 divides this portion of the light beam into two approximately equal energy portions that travel along the two different optical paths 63 and 65 as shown. Optionally, a low reflection mirror 60 may be provided in the path 59 to direct a small portion of the wave to a detector 62 that determines the amplitude or relative phase of the light beam component that issues from the crystal 21 and controls either the low frequency electrical field impressed upon the crystal 21, or the frequency of the laser 85 in order to lock together the resonant frequencies of the two cavities 21 and 85. The remainder of this portion of the beam travels along a path 64 to the beam splitter 61. Locking the two resonator frequencies together is equivalent to requiring a phase shift of $2\pi N$ ($N=0,\pm 1,\pm 2,...$) in the modulator.

The second portion of the input light beam produced by the first beam splitter 55 travels along a path 67 of the second optical path until it encounters a high reflectivity mirror 69, combined with a piezoelectric element 89 that is used to hold the static phase shift associated with the two beam components in balance. The second portion of the light beam then travels along the leg 71 of the second optical path until the beam encounters the second 50/50 beam splitter 61, where this second portion of the beam is also split into two sub-portions that travel along the optical paths 63 and 65 as shown. The two beams traveling along the legs 59 and 71 should have good spatial overlap at the beam splitter 61 for maximum modulation. This overlap may be assured by making the curvatures of the faces of the crystal 21 and the piezoelectric element 89 equal, or by adding a lens of appropriate focal length in the optical path 59 or the optical path 71.

Each of the two components of the light beam contributes to the first composite beam traveling along the path 63 and to the second composite beam traveling along the optical path 65. These two composite beams are complements of one another, if one disregards losses associated with different optical components in the two optical paths. The first composite beam encounters a high reflectivity mirror 91 that redirects this first composite beam along a path 93 that is approximately parallel to, but spaced apart from, the optical path 65. The redirected first composite beam encounters a low reflectivity mirror 95 that directs a small amount of beam energy to a detector 97 for purposes of monitoring the amplitude of the first composite beam as a function of time. The remainder of the first composite beam continues along an optical path 99. The second composite beam, traveling along the optical path 65, encounters a low reflectivity mirror 101 that directs a small amount of the beam energy to a detector 103 for purposes of maintaining balanced beams in the paths 63 and 65 by adjusting the piezo-electric element 89. The remainder of the second composite beam continues along an optical path 105 that may be, but need not be, approximately parallel to the optical path 99. Because the two composite output beams traveling along the optical path 99 and 105 are approximately complements of one another, when the amplitude of one of these beams is low, i.e. near zero, the amplitude of the other of these beams will have a relatively high magnitude, and inversely. Either of these beams may be used as the modulated light beam for purposes of data communications or other uses. Alternatively, the two composite output beams could be directed to a pair of detectors for data communications purposes so that the time-varying signal received at one detector could act as a check on the time-varying signal received at the other detector.

The frequency produced by the light source or laser 85 may be dithered or otherwise periodically varied about a central frequency at a low dithering rate, in the order of $1-10^5$ kHz, in order to promote self-correction of the resonance frequency for the modulator. The dithering frequency should be chosen to be a very small fraction of the modulation frequency for this purpose.

An important advantage of the ring modulator over a linear modulator is that no light is reflected back to the light source with a ring modulator. Reflection of light back into a single frequency laser can cause instabilities. The preferred angle between the input beam path 29 and the output beam path 31 shown in FIG. 1 is 90°, but many other angles may be used.

Figure 8:
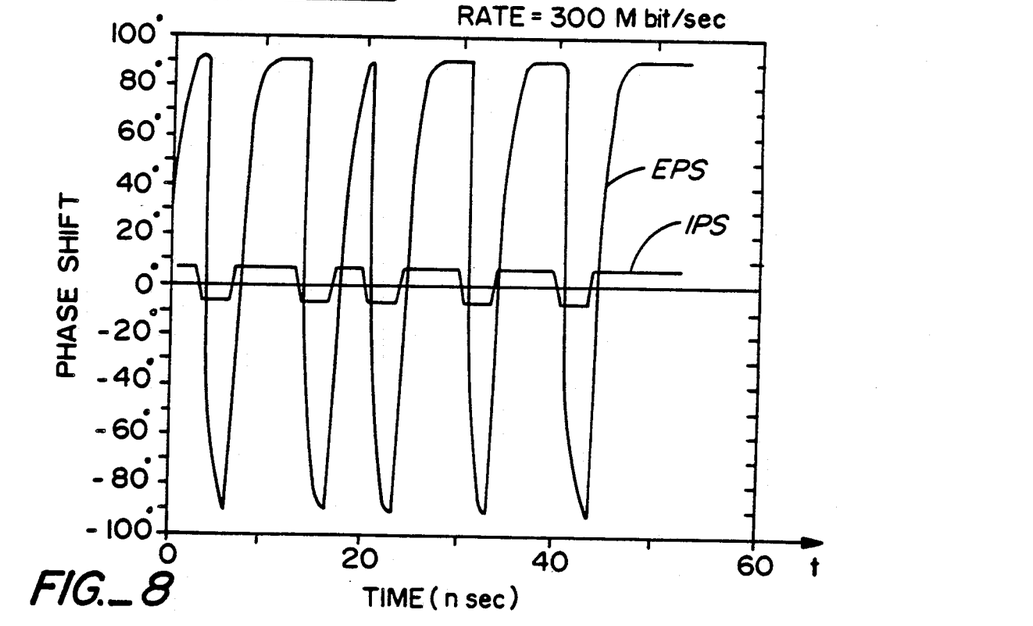
Figure 9:
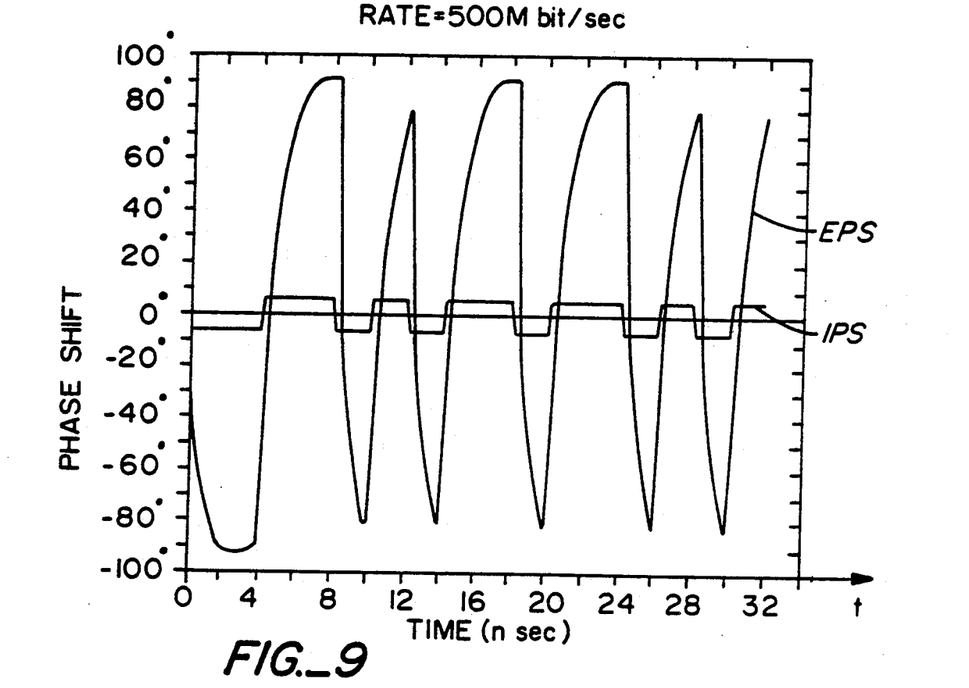

The invention disclosed here is capable of modulating the light beam amplitude at rates up to 1 GHz. or even higher, depending on the size of the electro-optical crystal 21 used for phase modulation or amplitude modulation purposes. FIG. 8 graphically illustrates the relative external phase shift, EPS, of the output beam that issues from the crystal 21 in response to small, rapid changes in internal phase shift, IPS, impressed by the crystal. At a rate of 300 Mbits/sec, the electro-optical crystal has no problem reaching the target phase shift values of ±90° as shown in FIG. 8. In FIG. 9, the information transfer rate has increased to 500 Mbits/sec, and one notes that the target value of the external phase shift EPS of ±90° is barely attained at this information transfer rate. At higher information transfer rates such as 1 Gbit/sec, the external phase shift EPS reaches extreme values of only about ±50° with this s modulator. (round trip physical path length ~13 mm).

Figure 10:
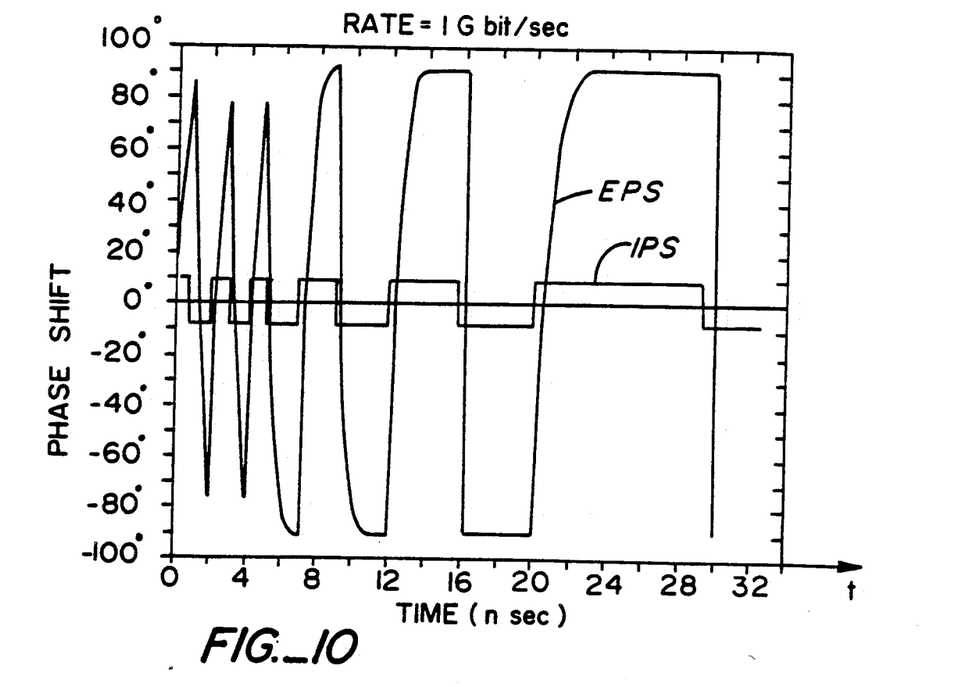
FIG. 10 is a plot of the external phase shift as a function of time for shifts in the crystal internal phase at rates of 1 Gigabit s/sec., with the size of the electro-optical modulator reduced by 50 percent from the size represented by FIGS. 8 and 9.

FIGS. 8 and 9 are calculated with reference to an electro-optical crystal having a round trip path length of 13 mm. If the crystal dimensions are halved so that round trip physical path length is reduced to 6.5 mm, information transfer rates of up to 1 Gbit/sec are attained using this smaller system, as illustrated in FIG. 10. The thickness of the electro-optical crystal that can be used with the invention is limited at the lower end by problems of heat dissipation in the crystal, voltage breakdown across the crystal and other considerations. Where a voltage swing of 40 Volts is impressed across a crystal thickness of 1 mm, the average electrical field across this thickness is 0.04 Volts/$\mu$m, which is modest enough that voltage breakdown is not a serious problem here.

Figure 11:
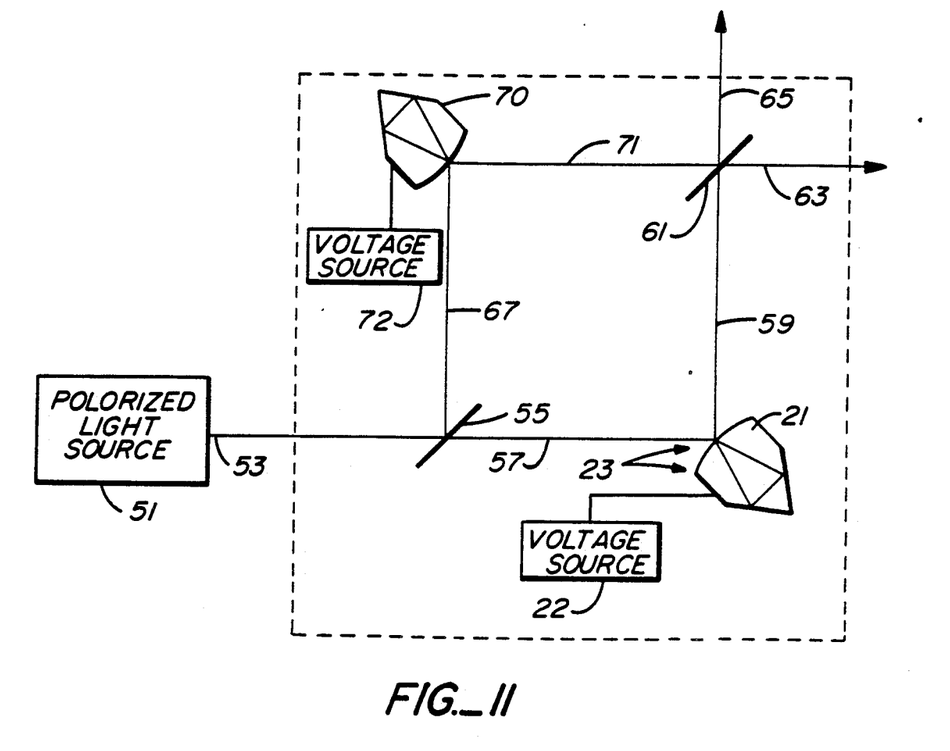
FIG. 11 is a plan view of another embodiment of the invention, using two electro-optical modulators that are operated together.
Figure 12:
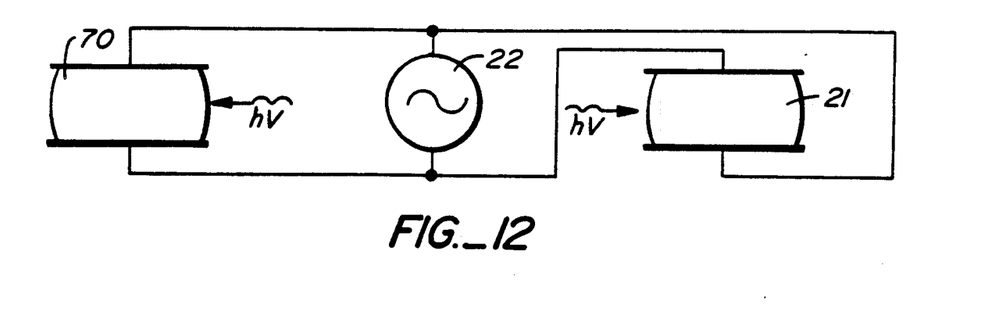
FIG. 12 is a side view of two electro-optical modulators, of opposite polarities, driven by a single voltage source in accord with the invention.

The interferometer configuration shown in FIGS. 3 or 7 may be replaced by the configuration shown in FIG. 11, where the high reflectivity mirror 69 of FIG. 3 is replaced by a second electro-optical crystal 70 that is similar to the electro-optical crystal 21. The configuration of FIG. 11 now has two active devices, the crystals 21 and 70, each of which is controlled by a time varying voltage source 22 and 72, respectively. The two voltage sources 22 and 72 may be combined into a single voltage source if the two electro-optical crystals 21 and 70 are driven by the same voltage or by opposite polarity voltages. One advantage of use of two electro-optical crystals in tandem as shown in FIG. 11 is that by driving the optical phase for the first and second light beam components in opposite directions to achieve a cumulative 180° external phase shift, the system requires maximum driving voltages that are only half as large as the maximum driving voltage used in FIG. 3. A possible disadvantage of the interferometer configuration of FIG. 11, vis-a-vis the configuration of FIG. 3, is the added complexity of controlling two time varying voltage sources to within a time interval of the order of one nsec or less. This added complexity may be avoided by use of a single time varying voltage source 22 to drive the two electro-optical crystals 21 and 70 with opposite electrical field polarities, as shown in one embodiment in FIG. 12 for transverse electro-optical crystals.

If the crystal has no internal losses, 100 percent of the light would always be contained in the reflected beam, independent of the phase change introduced by the crystal. If the front phase mirror is assumed to have 80 percent reflectivity and the crystal 21 is assumed to have a round trip loss of 0.5 percent, the theoretical reflectivity shows a modest (10 percent) dip, as illustrated in FIG. 4, as the modulation or phase shift of the output signal is varied over a cycle of 360°. The theoretical reflectivity or reflected power illustrated in FIG. 4 shows a dip because at resonance more power is coupled into the cavity and is dissipated in the round trip losses.

The three mirror optical cavity shown in FIG. 1 is two total internal reflection surfaces plus a front face that serves as a third mirror. The front face is preferably curvilinear (spherical or cylindrical) rather than planar, with a radius of curvature chosen so that the ring cavity forms a stable resonator according to the theory presented in A. Yariv, op.cit., chapter 4 and appendix A. However, any one of the three faces 23, 25 and 27 (FIG. 1) can be chosen as the curvilinear face in order to produce a stable optical resonator. We have fabricated devices made from a single crystal of lithium niobate, $LiNbO_3$, with a thickness of 2 mm and round trip optical path lengths within the crystal of 13.2 mm and 26.4 mm. This crystal is used in a transverse electro-optical configuration. The electrodes are positioned in planes parallel to the plane of the optical path shown in FIG. 1. The electrodes were goldplated onto the top and bottom of the electro-optical crystal 21 to produce a transverse modulator configuration. The incident laser beam should be polarized perpendicular to the plane of these electrodes. Table I presents some transverse configuration electro-optical materials, the associated wavelengths and indices of refraction for such materials that could be used in this configuration. Table I is not meant to exhaust the list of possible transverse configuration electro-optical materials.

TABLE I

| Material | Some Transverse Electro-optical Materials | | |
|---|---|---|---|
| | Refractive Indices | Wavelength | Crystal Class |
| CdTe | n = 2.84 | 1.0 | 43 m |
| | 2.60 | 10.6 | |
| GaAs | 3.60 | 0.9 | 43 m |

TABLE I-continued

| Material | Some Transverse Electro-optical Materials | | |
|---|---|---|---|
| | Refractive Indices | Wavelength | Crystal Class |
| | 3.43 | 1.15 | |
| | 3.30 | 3.39 | |
| | 3.30 | 10.6 | |
| GaP | 3.66 | 0.55 | 43 m |
| | 3.32 | 0.633 | |
| | 3.10 | 1.15 | |
| | 3.02 | 3.39 | |
| $\beta$-ZnS | 2.52 | 0.4 | 43 m |
| | 2.42 | 0.5 | |
| | 2.36 | 0.6 | |
| | 2.35 | 0.633 | |
| ZnSe | 2.66 | 0.548 | 43 m |
| | 2.60 | 0.616 | |
| | 2.39 | 0.633 | |
| ZnTe | 3.06 | 0.589 | 43 m |
| | 3.01 | 0.616 | |
| | 2.99 | 0.633 | |
| | 2.93 | 0.690 | |
| | 2.70 | 3.41 | |
| | 2.70 | 10.6 | |

TABLE II

| Material | Some Transverse/Longitudinal Electro-optical Materials | | |
|---|---|---|---|
| | Refractive Indices | Wavelength | Crystal Class |
| $LiNbO_3$ | $n_o = 2.286, n_e = 2.200$ | $\lambda = 0.633 \mu m$ | 3 m |
| | 2.229, 2.150 | 1.15 | |
| | 2.136, 2.073 | 3.39 | |
| $LiTaO_3$ | 2.176, 2.180 | 0.633 | 3 m |
| | 2.060, 2.065 | 3.39 | |

Longitudinal configuration electro-optical materials may also be used here, the only different feature being that the electrical field produced by the electrodes must now be in a direction that is partly parallel to the direction of propagation of the light beam. With reference to FIG. 1, one implementation of this would position the electrical field approximately parallel to the leg 30b of the optical path shown there. Table III sets forth some longitudinal configuration electro-optical materials and the wavelengths and associated indices of refraction for such materials. Some materials, such as $LiNbO_3$ and $LiTaO_3$, can serve in a transverse or in a longitudinal configuration, as indicated in Table II above.

TABLE III

| Material | Some Longitudinal Electro-optical Materials | | |
|---|---|---|---|
| | Refractive Indices | Wavelength | Crystal Class |
| $AgGaS_2$ | $n_o = 2.553, n_e = 2.507$ | $\lambda = 0.633 \mu m$ | 42 m |
| $CsH_2AsO_4$ | 1.572, 1.550 | 0.55 | 42 m |
| $KH_2PO_4$ | 1.5115, 1.4698 | 0.546 | 42 m |
| | 1.5074, 1.4667 | 0.633 | |
| $KD_2PO_4$ | 1.5079, 1.4683 | 0.546 | 42 m |
| | 1.502, 1.462 | 0.633 | |
| $(NH_4)H_2PO_4$ | 1.5266, 1.4808 | 0.546 | 42 m |
| | 1.5220, 1.4773 | 0.633 | |
| $(NH_4)HDPO_4$ | | | 42 m |
| $(NH_4)D_2PO_4$ | 1.516, 1.475 | 0.633 | 42 m |

The largest electro-optical coefficient for lithium niobate, $r_{33}$, is associated with the z-axis, which is made perpendicular to the planes of the electrodes in some of the crystals that we fabricated with this material. In another fabricated crystal, we made the y-axis perpendicular to the plane of the electrodes. The associated electro-optical coefficient, $r_{22}$, is almost one order of magnitude lower than the coefficient $r_{33}$ at the high frequencies used for data communications. Further, the electro-optical effect associated with the coefficient $r_{22}$ at low frequencies is a sum of the primary and secondary electro-optical effects, which are not independent of the directions of the other two crystal axes. However, the electro-optical effect associated with the y-axis may have better thermal stability. The change with respect to temperature of the ordinary refractive index $n_o$ is affected by the electro-optical coefficient $r_{22}$, and this change with the temperature is much less than the corresponding change for the refractive index of the extraordinary wave $n_e$, which is affected by $r_{33}$. At higher finesse values, when more power is coupled into the crystal losses, there is some concern that the resultant heating can cause undesired phase changes in the crystal.

The modulators we fabricated were coated for use with 1.06 $\mu$m light but could be used with other useful wavelengths such as 1.32 $\mu$m, 2.1 $\mu$m and other wavelengths. The coating on the phase modulator crystal 21 was 80 percent reflective at the wavelength of 1.06 $\mu$m, but higher or lower reflectivity coatings can be used.

FIGS. 4 and 5, illustrate the change in theoretical reflectivity and external phase shift with modulation. We find that 180° of external phase shift about the center resonance point is obtained with 12.75° of internal optical phase shift so that the external phase shift is amplified by a factor of 180/12.75=14.1. The corresponding finesse of the modulator is 28.2, which is close to the theoretical value. The associated amplitude variation around resonance, as shown in FIG. 5, is about 4.9 percent.

The voltage required to scan a full free spectral range, and thereby produce 360° of external phase shift, is calculated to be approximately 1064 volts for LiNbO$_3$ with a refractive index n=2.2 and electro-optical coefficient $r_{33}=30.2\times10^{-12}$/volt and light wavelength $\lambda=1.06$ $\mu$m. For this system, with a finesse of 28.2, the voltage change required to switch 180 of external phase shift, or from light to dark with amplitude modulation, is theoretically 1064/28.2=38 volts. In the laboratory, we measured 40 volts and measured an absorption dip at the line center of about 6 percent. Thus, at the low frequencies (of the order of 60 Hz.) used for testing purposes, our interpretation appears to be accurate. At high frequencies, such as 1 GHZ., the voltage required to produce an external phase shift to 180° is about 44 volts.

If the y-axis, rather than the z-axis, of the electro-optical crystal 21 is perpendicular to the plane of the electrodes in FIG. 2 with the same cavity finesse, the voltage switch required to produce a 180° external phase shift is about 175 volts at low frequencies and about 350 volts at the high frequencies of interest for data communications.

Optical cavity lifetime may also place limitations on the high frequency response of the electro-optical crystal. The calculated cavity lifetime with 80 percent front face reflectivity and path length 13 mm is 0.43 nsec, and the reciprocal of this number yields an upper frequency limit of 2.3 GHz. However, use of a different front face reflectivity or an electro-optical material different from lithium niobate or the use of a different physical path length within the crystal could raise or lower this limit.

In use, it is preferred that the frequency of the light beam be locked to the center of the resonance of the electro-optical crystal. If the invention is to be used as an amplitude modulator, the Mach-Zehnder interferometer setup shown in FIG. 3 should be either actively stabilized or designed for very high passive stability so that the only optical element whose response varies appreciably is the electro-optical crystal 21.

A number of tradeoffs between speed of response, size of the electro-optical crystal and ease of fabrication of these modulators exist. The required voltage for 180° external phase shift modulation can be reduced in at least two ways: (1) by increasing the finesse of the optical cavity through reducing the front face mirror transmission and (2) by making the electro-optical crystal thinner for a given path length. When the power density in the crystal reaches a level at which thermal or photorefractive problems prohibit frequency locking, the thickness of the crystal cannot be further reduced. We have encountered no problems up to power density levels of about 130 kW/cm$^2$ at 1.06 $\mu$m wavelengths. If we wish to modulate a 1 Watt beam, the beam in the modulator must have a diameter greater than 0.1 mm in order to avoid optical damage and thermal problems. From a practical point of view, it may be difficult to fabricate an electro-optical crystal of thickness 0.1 mm.

Increasing the finesse of the optical cavity increases the cavity lifetime, which reduces the maximum modulation frequency $f_{max}$ that can be used. We have used a computer model that shows that an 80 percent front face reflectivity (associated finesse=28.2) and a 13.1 mm round trip optical path length allows $f_{max}=300$–500 Mbits/sec. The cavity lifetime depends upon the inter reflectivity and crystals losses and upon the optical path length within the resonator. If the size of the modulator is reduced by a factor of two, $f_{max}$ is increased by approximately the same proportion. Use of a shorter optical path length reduces the cavity lifetime and also reduces the power absorbed by losses in a single round trip. The associated capacitance of the crystal is proportional to the area of the crystal divided by its thickness. Thus, reducing all dimensions of an electro-optical crystal by a factor of two would decrease the capacitance by this factor and decrease cavity lifetime by this factor.

We claim:

1. Light beam modulation apparatus for varying the optical phases of a light beam output signal relative to the optical phase of a light beam input signal, the apparatus comprising:

an optically resonant electro-optical crystal, having a first partially transmissive crystal face to receive a light beam having a frequency-stabilized single frequency and to cause a portion of the light beam to propagate internally within the crystal, and having at least second and third crystal faces positioned to reflect this internally propagating portion of the beam so that this portion follows a closed path within the crystal with a phase shift $\phi$ that varies around a resonant value $\phi_r=2N\pi$, where N is a non-zero integer, along this closed path, where a portion of this internally propagating portion of the light beam that arrives at the first crystal face combines with an externally reflected portion of the light beam to form an output beam propagating in a selected direction; and a voltage source positioned adjacent to the crystal to impress a controllable, time-varying voltage deference across the crystal in a second selected direction to controllably vary the phase shift $\phi$ about the resonant value $\phi_r=2N\pi$.

2. The apparatus of claim 1, wherein said electro-optical crystal is drawn from the class consisting of CdTe, GaAs, GaP, ZnS, ZnSe and ZnTe.

3. The apparatus of claim 1, wherein said electro-optical crystal is drawn from the class consisting of LiNbO$_3$ and LiTaO$_3$.

4. The apparatus of claim 1, wherein said electro-optical crystal is drawn from the class consisting of AgGaS$_2$, CsH$_2$AsO$_4$, KH$_2$PO$_4$, KD$_2$PO$_4$, (NH$_4$)H$_2$PO$_4$, (NH$_4$)HDPO$_4$ and (NH$_4$)D$_2$PO$_4$.

5. The apparatus of claim 4, wherein said electrical field has a direction that has a non-zero component lying in the plane defined by the optical path of said light beam in said crystal.

6. The apparatus of claim 1, wherein said voltage source can change the polarity of said impressed electrical field at a frequency that is greater than 0 Hertz and is no greater than $10^9$ Hertz.

7. The apparatus of claim 1, wherein said crystal has a finesse of at least 4.4.

8. The apparatus of claim 1, wherein said first crystal face has an associated optical reflectivity of at least 50 percent for the wavelength of said light beam.

9. The apparatus of claim 1, wherein the round trip optical path within said crystal has a length L and one of said first, second and third crystal faces is curvilinear and has a curvature R satisfying the relation $R > L/2$.

10. The apparatus of claim 1, further comprising a light beam source that produces a frequency-stabilized light beam with a selected polarization direction, where this light beam is received by said electro-optical crystal.

11. The apparatus of claim 1, further comprising voltage control means for impressing a control voltage across said crystal to maintain a time average of said phase shift $\phi$ at said resonant phase shift value $\phi_r$.

12. The apparatus of claim 1, wherein said internally propagating portion of said light beam is reflected by total internal reflection at at least one of said second crystal face and said third crystal face.

13. The apparatus of claim 12, wherein said voltage source can modulate said voltage difference between said two electrodes at a frequency greater than 0 Hertz and no greater than $10^9$ Hertz.

14. The apparatus of claim 13, wherein said electro-optical crystal is drawn from the class consisting of CdTe, GaAs, GaP, ZnDS, ZnSe and ZnTe.

15. The apparatus of claim 19, wherein said electro-optical crystal is drawn from the class consisting of LiNbO$_3$ LiTaO$_3$.

16. The apparatus of claim 12, wherein said electro-optical crystal is composed of a longitudinal electro-optical material drawn from the class consisting of AgGaS$_2$, CsH$_2$AsO$_4$, KH$_2$PO$_4$, KD$_2$PO$_4$, (NH$_4$)H$_2$PO$_4$, (NH$_4$)HDPO$_4$ and (NH$_4$)D$_2$PO$_4$.

17. The apparatus of claim 16, wherein said polarization direction of said light beam is chosen to lie in a plane defined by the optical path of said light beam in said crystal.

18. Light beam modulation apparatus comprising:
a light beam source that produces a single frequency, frequency-stabilized light beam with a selected polarization direction;
beam splitter means for receiving the light beam and for producing first component and second component light beams that issue therefrom in different directions;
phase shift means for receiving the first component light beam from the splitter means, for splitting off a portion of this light beam and shifting the phase of this portion, relative to the remainder portion of the first component light beam, by a time-variable, controllable phase shift $\phi$ about a resonant phase shift value $\phi_r = 2N\pi$, where N is a non-zero integer, and for combining the split-off portion of the beam with the remainder portion of the beam as a first composite light beam that propagates in a selected direction; and
beam combiner means for combining the first composite light beam with the second component light beam as an overall composite light beam, whereby the amplitude of the overall composite light beam may be controllably modulated.

19. The apparatus of claim 18, wherein said phase shift means comprises:
an optically resonant electro-optical crystal, having a first partially transmissive crystal face to receive said first component light beam and to cause a portion of this light beam to propagate internally within the crystal, and having at least second and third crystal faces positioned to reflect this internally propagating portion of this beam so that this portion follows a closed path within the crystal with said phase shift $\phi_r$ along this closed path, where a portion of this internally propagating portion of said first component light beam that arrives at the first crystal face combines with an externally reflected portion of said first component light beam to form said first composite light beam propagating in a selected direction;
two electrodes positioned so that the electro-optical crystal lies between the two electrodes; and
a voltage source positioned adjacent to the crystal to impress a controllable, time-varying voltage difference across the crystal in a second selected direction to controllably vary said phase shift $\phi$ about said resonant value $\phi_r = 2N\pi$.

20. The apparatus of claim 19, further comprising voltage control means for impressing a control voltage across said crystal to maintain a time average of said phase shift $\phi$ at a said resonant phase shift value $\phi_r$.

21. The apparatus of claim 19, wherein said internally propagating portion of said light beam is reflected by total internal reflection at at least one of said second crystal face and said third crystal face.

22. The apparatus of claim 18, further comprising:
second phase shift means for receiving said second component light beam from said splitter means, for splitting off a portion of this light beam and shifting the phase of this portion, relative to the remainder portion of said second component light beam, by a time-variable, controllable phase shift $\psi$ about a resonant phase shift value $\psi_r = 2M\pi$, where M is a non-zero integer, and for combining the split-off portion of the beam with the remainder portion of the beam as a second composite light beam that propagates in a selected direction, where said beam combiner means combines the second composite light beam with said first composite light beam.

23. The apparatus of claim 22, wherein said first phase shift means and said second phase shift means together comprise:
a first optically resonant electro-optical crystal, having a first partially transmissive crystal face to receive said first component light beam and to cause a portion of this light beam to propagate internally within the crystal, and having at least second and third crystal faces positioned to reflect this internally propagating portion of this beam so that this portion follows a closed path within the crystal with a phase shift $\phi_r = 2N\pi$, where N is a non-zero integer, along this closed path, where a portion of this internally propagating portion of said first component light beam that arrives at the first crystal face combines with an externally-reflected portion of said first component light beam to form said first composite light beam propagating in a first selected direction;

a second optically resonant electro-optical crystal, having a first partially transmissive crystal face to receive said second component light beam and to cause a portion of this light beam to propagate internally within the crystal, and having at least second and third crystal faces positioned to reflect this internally propagating portion of the beam so that this portion follows a closed path within the crystal with a phase shift $\psi_r = 2M\pi$, where M is a non-zero integer, along this closed path, where a portion of this internally propagating portion of said second component light beam that arrives at the first crystal face combines with an externally reflected portion of said second component light beam to form said second component light beam propagating in a second selected direction;

first and second electrodes, positioned so that the first electro-optical crystal lies between the first and second electrodes;

third and fourth electrodes, positioned so that the second electro-optical crystal lies between the third and fourth electrodes; and a voltage source having a positive terminal connected to the first and fourth electrodes and having a negative terminal connected to the second and third electrodes to impress controllable, time-varying first and second voltage differences of opposite polarities across the first and second electro-optical crystals.

24. Light beam modulation apparatus for varying the optical phases of a light beam output signal relative to the optical phase of a light beam input signal, the apparatus comprising:

an optically resonant electro-optical crystal, having a first partially transmissive crystal face with optical reflectivity at least 50 percent to receive a light beam having a frequency-stabilized single frequency and to cause a portion of the light beam to propagate internally within the crystal, and having at least second and third crystal faces positioned to reflect this internally propagating portion of the beam so that this portion follows a closed path within the crystal with a phase shift $\phi$ that varies around a resonant value $\phi_r = 2N\pi$, where N is a non-zero integer, along this closed path, where a portion of this internally propagating portion of the light beam that arrives at the first crystal face combines with an externally reflected portion of the light beam to form an output beam propagating in a selected direction; and a voltage source positioned adjacent to the crystal to impress a controllable, time-varying voltage difference across the crystal in a second selected direction to controllably vary the phase shift $\phi$ about the resonant value $\phi_r = 2N\pi$.

25. Light beam modulation apparatus for varying the optical phases of a light beam output signal relative to the optical phase of a light beam input signal, the apparatus comprising:

an optically resonant electro-optical crystal, having a first partially transmissive crystal face to receive a light beam having a frequency-stabilized single frequency and to cause a portion of the light beam to propagate internally within the crystal, and having at least second and third crystal faces positioned to reflect this internally propagating portion of the beam so that this portion follows a closed path within the crystal with a phase shift $\phi$ that varies around a resonant value $\phi_r = 2N\pi$, where N is a non-zero integer, along this closed path, where a portion of this internally propagating portion of the light beam that arrives at the first crystal face combines with an externally reflected portion of the light beam to form an output beam propagating in a selected direction, and where the round trip optical path within the crystal has a length L and one of the first, second and third crystal faces is curvilinear and has a radius R satisfying the relation $R > L/2$; and a voltage source positioned adjacent to the crystal to impress a controllable, time-varying voltage difference across the crystal in a second selected direction to controllably vary the phase shift $\phi$ about the resonant value $\phi_r = 2N\pi$.

* * * * *

UNITED STATES PATENT AND TRADEMARK OFFICE
CERTIFICATE OF CORRECTION

PATENT NO. : 4,998,255

DATED : March 5, 1991

INVENTOR(S) : David C. Gerstenberger et al.

It is certified that error appears in the above-identified patent and that said Letters Patent is hereby corrected as shown below:

Column 1, line 24, "Watts/cm$_2$" should read -- Watts/cm$^2$ --.

Column 5, line 18, "Substantially, all" should read -- Substantially all --.

Columns 9 and 10, Table I, under column "Crystal Class", every "43 m" should read -- $\bar{4}$3 m --.

Column 10, Table III, under column "Crystal Class", every "42 m" should read -- $\bar{4}$2 m --.

Column 11, line 37, "180" should read -- 180° --.

Claim 1, column 12, lines 62-63, "deference" should read -- difference --.

Claim 14, column 13, line 44, "ZnDS" should read -- ZnS --.

UNITED STATES PATENT AND TRADEMARK OFFICE
CERTIFICATE OF CORRECTION

PATENT NO. : 4,998,255

DATED : March 5, 1991

INVENTOR(S) : David C. Gerstenberger et al.

It is certified that error appears in the above-identified patent and that said Letters Patent is hereby corrected as shown below:

Claim 15, column 13, line 45, "The apparatus of claim 19" should read -- The apparatus of claim 12--.

Claim 15, column 13, line 47, "$LiNbO_3$ $LiTaO_3$" should read -- $LiNbO_3$ and $LiTaO_3$ --.

Signed and Sealed this

Thirteenth Day of October, 1992

Attest:

DOUGLAS B. COMER

*Attesting Officer*     Acting Commissioner of Patents and Trademarks